US010088596B2

(12) United States Patent
Maerten

(10) Patent No.: US 10,088,596 B2
(45) Date of Patent: Oct. 2, 2018

(54) MESHLESS REPRESENTATION OF A GEOLOGIC ENVIRONMENT

(71) Applicant: SCHLUMBERGER TECHNOLOGY CORPORATION, Sugar Land, TX (US)

(72) Inventor: Frantz Maerten, Pignan (FR)

(73) Assignee: Schlumberger Technology Corporation, Sugar Land, TX (US)

(*) Notice: Subject to any disclaimer, the term of this patent is extended or adjusted under 35 U.S.C. 154(b) by 1216 days.

(21) Appl. No.: 14/197,661

(22) Filed: Mar. 5, 2014

(65) Prior Publication Data
US 2014/0278298 A1 Sep. 18, 2014

(30) Foreign Application Priority Data

Mar. 15, 2013 (FR) ...................................... 13 00592

(51) Int. Cl.
G01V 99/00 (2009.01)
(52) U.S. Cl.
CPC .................................. *G01V 99/005* (2013.01)
(58) Field of Classification Search
CPC .................................................. G01V 99/005
See application file for complete search history.

(56) References Cited

U.S. PATENT DOCUMENTS

| 5,999,487 A | 12/1999 | Deplante et al. |
| 7,660,480 B1 | 2/2010 | Wu et al. |
| 8,315,845 B2 | 11/2012 | Lepage |
| 9,355,494 B1* | 5/2016 | Mallet ..................... G01V 1/302 |
| 2002/0109684 A1* | 8/2002 | Repin ....................... G01V 1/34 345/424 |
| 2004/0172199 A1* | 9/2004 | Chavarria ................ G01V 1/28 702/14 |
| 2006/0176488 A1 | 8/2006 | McGraw |
| 2010/0223039 A1* | 9/2010 | Maliassov .............. G01V 99/00 703/2 |
| 2011/0054857 A1 | 3/2011 | Moguchaya |
| 2011/0106507 A1 | 5/2011 | Lepage |
| 2012/0117124 A1* | 5/2012 | Bruaset ................. G06T 17/005 707/797 |
| 2013/0246031 A1* | 9/2013 | Wu ......................... G06T 17/05 703/10 |

FOREIGN PATENT DOCUMENTS

| CN | 101944144 A | 1/2011 |
| CN | 102831280 A | 12/2012 |
| WO | 2012052786 A2 | 4/2012 |

OTHER PUBLICATIONS

Jarocha-Ernst, "Creating Landscapes with simulated colliding plates", Rochester Institute of Technology RIT Scholar Works, Thesis, Jun. 7, 2006.*

(Continued)

*Primary Examiner* — Maurice L McDowell, Jr.

(57) ABSTRACT

A method can include sampling points for at least a portion of a model of a geologic environment; generating a meshless model based at least in part on the points where the points correspond to nodes having respective domains of influence; and, based at least in part on the meshless model, computing a tensor field associated with forces experienced by at least a portion of the nodes. Various other apparatuses, systems, methods, etc., are also disclosed.

20 Claims, 10 Drawing Sheets

(56) References Cited

OTHER PUBLICATIONS

Mirzaei, "Determination of Stress Intensity Factors for Jointed Brittle Rock Medium Using Element Free Galerkin Method", ISRM International Symposium 2008, 5th Asian Rock Mechanics Symposium (ARMS5), Nov. 24-26, 2008 Tehran, Iran.*

Rabczuk, "Adaptivity for structured meshfree particle methods in 2D and 3D", International Journal for Numerical Methods in Engineering, Apr. 18, 2005.*

Komoroczi, et al., "Meshless numerical modeling of brittle-viscous deformation: first results on boudinage and hydrofracturing using a coupling of discrete element method (DEM) and smoothed particle hydrodynamics (SPH)", Jan. 11, 2013, Computational Geosciences, vol. 17, No. 2, pp. 373-390.

European Search Report issued in related EP application 14770269.0 dated Mar. 24, 2016, 5 pages.

Office Action issued in related EP application 14770269.0 dated May 30, 2016, 5 pages.

Communication pursuant to Article 94(3) for the equivalent European patent application 14770269.0 dated Feb. 9, 2017.

Mueller et al., Point Based Animation of Elastic, Plastic and Melting Objects, Eurographics/ACM SIGGRAPH Symposium on Computer Animation, 2004 (11 pages).

Belytschko et al., Meshless Methods: An Overview and Recent Developments, May 2, 1996 (79 pages).

Belytschko, Crack Propagation by Element-Free Galerkin Methods, Final Report, Air Force Research Grant F49620-94-0117, 1997 (86 pages).

Gross and Pfister, Point-Based Graphics, 2007; pp. 361-363 and 369 (4 pages).

Nealen A.: An As-Short-As-Possible Introduction to the Least Squares, Weighted Least Squares and Moving Least Squares Methods for Scattered Data Approximation and Interpolation. Tech. Rep., TU Darmstadt, 2004 (3 pages).

* cited by examiner

MESHLESS REPRESENTATION OF A GEOLOGIC ENVIRONMENT

RELATED APPLICATIONS

This application claims the priority to and the benefit of French Patent Application No. 1300592, filed 15 Mar. 2013, listing inventor Frantz Maerten, which is incorporated by reference herein.

BACKGROUND

Phenomena associated with a geologic environment (e.g., a subsurface region, whether below a ground surface, water surface, etc.) may be modeled using various equations (e.g., stress, fluid flow, thermal, phase, etc.). As an example, a numerical model of a geologic environment may find use for understanding various processes related to exploration and production of natural resources (e.g., assessing depositional history, estimating reserves in place, drilling wells, forecasting production, etc.).

SUMMARY

A method can include sampling points for at least a portion of a model of a geologic environment; generating a meshless model based at least in part on the points where the points correspond to nodes having respective domains of influence; and, based at least in part on the meshless model, computing a tensor field associated with forces experienced by at least a portion of the nodes. A system can include a processor; memory operatively coupled to the processor; and one or more modules that include processor-executable instructions stored in the memory to instruct the system to sample points for at least a portion of a model of a geologic environment; generate a meshless model based at least in part on the points where the points correspond to nodes having respective domains of influence; and, based at least in part on the meshless model, compute a tensor field associated with forces experienced by at least a portion of the nodes. One or more computer-readable storage media can include computer-executable instructions to instruct a computing system to: sample points for at least a portion of a model of a geologic environment; generate a meshless model based at least in part on the points where the points correspond to nodes having respective domains of influence; and, based at least in part on the meshless model, compute a tensor field associated with forces experienced by at least a portion of the nodes. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
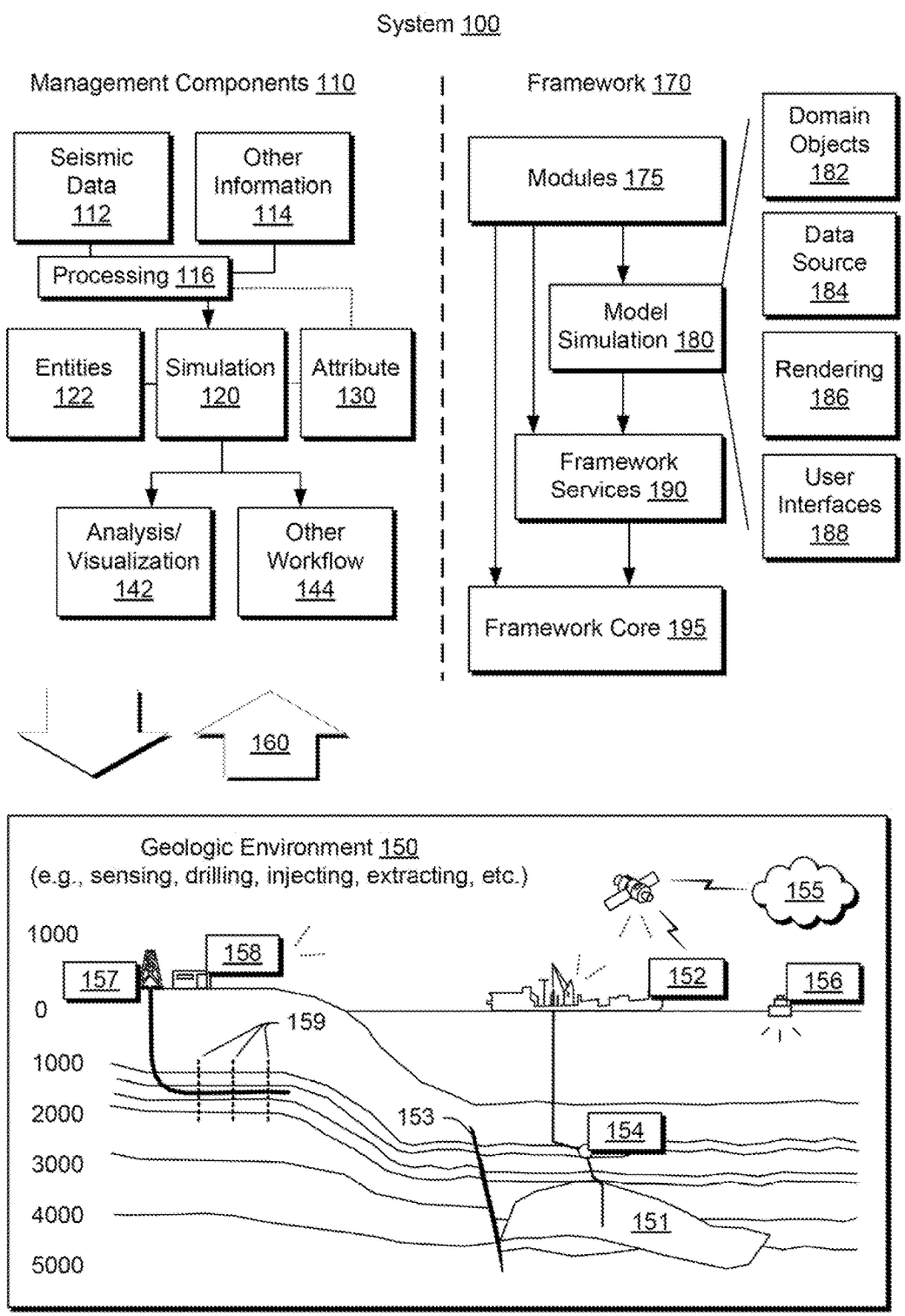
FIG. 1 illustrates an example system that includes various components for modeling a geologic environment and various equipment associated with the geologic environment.

This description is not to be taken in a limiting sense, but rather is made merely for the purpose of describing the general principles of the implementations. The scope of the described implementations should be ascertained with reference to the issued claims.

Phenomena associated with a geologic environment (e.g., a subsurface region, whether below a ground surface, water surface, etc.) may be modeled using various equations (e.g., stress, fluid flow, thermal, phase, etc.). As an example, a numerical model of a basin may find use for understanding various processes related to exploration and production of natural resources (e.g., assessing depositional history, estimating reserves in place, drilling wells, forecasting production, etc.).

In basin and petroleum systems modeling quantities such as temperature, pressure and porosity distributions within sediments may be modeled by solving partial differential equations (PDEs) using a numerical technique. Modeling may also model geometry with respect to time, for example, to account for changes stemming from geological events (e.g., deposition of material, erosion of material, shifting of material, etc.).

For application of a numerical technique, equations may be discretized using a mesh (e.g., a grid) that includes nodes, cells, etc. For example, a numerical technique such as the finite difference method can include discretizing a 1D differential heat equation for temperature with respect to a spatial coordinate to approximate temperature derivatives (e.g., first order, second order, etc.). Where time is of interest, a derivative of temperature with respect to time may also be provided. As to the spatial coordinate, the numerical technique may rely on a spatial mesh that includes various nodes where a temperature will be provided for each node upon solving the heat equation (e.g., subject to boundary conditions, generation terms, etc.). Such an example may apply to multiple dimensions in space (e.g., where discretization is applied to the multiple dimensions). Thus, a mesh may discretize a volume of interest (VOI) into elementary elements (e.g., cells or grid blocks) that may be assigned or associated with properties (e.g. porosity, rock type, etc.), which may be germane to simulation of physical processes (e.g., fluid flow, reservoir compaction, etc.).

As another example of a numerical technique, consider the finite element method where space may be represented by one dimensional or multidimensional "elements". For one spatial dimension, an element may be represented as part of a mesh by two nodes positioned along a spatial coordinate. For multiple spatial dimensions, an element may include any number of nodes of a mesh. Further, some equations may be represented by nodes of an entire mesh while others may be represented by fewer nodes (e.g., consider an example for the Navier-Stokes equations where nodes represent velocity and fewer nodes may represent pressure). The finite element method may include providing nodes of a mesh that define triangular elements (e.g., tetrahedra in 3D, higher order simplexes in multidimensional spaces, etc.) or quadrilateral elements (e.g., hexahedra or pyramids in 3D, etc.), or polygonal elements (e.g., prisms in 3D, etc.). Such elements, as defined by corresponding nodes of a mesh, may be referred to as grid cells.

Yet another example of a numerical technique is the finite volume method. For the finite volume method, values for model equation variables may be calculated at discrete places on a mesh, for example, a node of the mesh that includes a "finite volume" surrounding it. The finite volume method may apply the divergence theorem for evaluation of fluxes at surfaces of each finite volume such that flux entering a given finite volume equals that leaving to one or more adjacent finite volumes (e.g., to adhere to conservation laws). For the finite volume method, nodes of a mesh may define grid cells.

As an example, at least a portion of a geologic environment may be represented meshlessly. For example, a meshless technique may be selected that can represent at least a portion of a geologic environment using nodes where each of the nodes is defined at least in part by a domain of influence. In such an example, at least a portion of a model of a geologic environment may be sampled using points where each of the points may correspond to a node of a meshless technique.

As an example, a meshless technique may include a weight function (e.g., a window function) that may be defined as having compact support (e.g., a subdomain within a domain, over which it is nonzero, is small relative to a remainder of the domain). In such an example, each subdomain may be associated with a node where the support may be referred to as the domain of influence of the node. As an example, a subdomain may be shaped as a disc, a sphere, etc. As an example, a domain may be sampled to include nodes where each of the nodes includes a subdomain that has a spatial extent where various subdomains may overlap. For example, a number of subdomains may overlay a node (e.g., of the order of several subdomains to of the order of ten subdomains or more, etc.).

As an example, a meshless technique may implement one or more of a kernel method, a moving least square (MLS) method, a meshless Petrov-Galerkin method, a partition of unity method, a smooth-particle hydrodynamics (SPH) method, etc. As an example, a meshless technique may be implemented to solve, at least in part, one or more equations, which may include one or more partial differential equations (PDEs). As an example, a meshless technique may include one or more discontinuous approximations, approximations with discontinuous derivatives, etc. As an example, a meshless technique may implement one or more visibility criteria (e.g., via a diffraction technique, a transparency technique, etc.).

As an example, a geologic environment may include various types of features (e.g., stratigraphic layers, faults, fractures, geobodies, etc.). As an example, a model of such an environment may be represented at least in part by nodes that may be associated with a meshless technique. In such an example, discretized equations associated with the meshless technique may be solved (e.g., subject to various conditions) to understand better physical phenomena associated with the environment. As an example, one or more features may be subject to one or more visibility criteria (e.g., as a condition or conditions). For example, an interface between two stratigraphic layers may be described with respect to one or more visibility criteria, a fault may be described with respect to one or more visibility criteria, a fracture (e.g., natural, hydraulic, etc.) may be described with respect to one or more visibility criteria, a geobody (e.g., a salt body, etc.) may be described with respect to one or more visibility criteria.

As an example, a method may implement one or more implicit functions where values may be determined therefor, for example, to visualize one or more features of a geologic environment, to divide a geologic environment, to further model a geologic environment, etc. As an example, a method may implement one or more implicit functions to determine isovalues where, for example, a horizon of a geologic environment (e.g., present day, historic, etc.) may be represented at least in part by an isovalue.

As an example, a restoration method for a geologic environment may include implementing one or more meshless techniques. As an example, a method may include implementing one or more meshless techniques to generate a model of a geologic environment in a depositional space.

FIG. 1 shows an example of a system 100 that includes various management components 110 to manage various aspects of a geologic environment 150 (e.g., an environment that includes a sedimentary basin, a reservoir 151, one or more fractures 153, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT®.NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more meshless techniques. For example, a framework may include a sampling component for sampling at least a portion of a model where sample points may be nodes of a meshless technique. Such a framework may include a visibility criteria component, for example, to implement one or more visibility criteria as part of a meshless technique. As an example, a framework may include a solver for solving one or more equations via a meshless technique. For example, consider a solver for solving one or more partial differential equations (PDEs) using a meshless technique where, for example, one or more visibility criteria may be implemented with respect to a feature or features (e.g., horizons, faults, fractures, geobodies, etc.).

The model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

In the example of FIG. 1, the domain objects 182 can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and that may be intersected by a fault 153. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
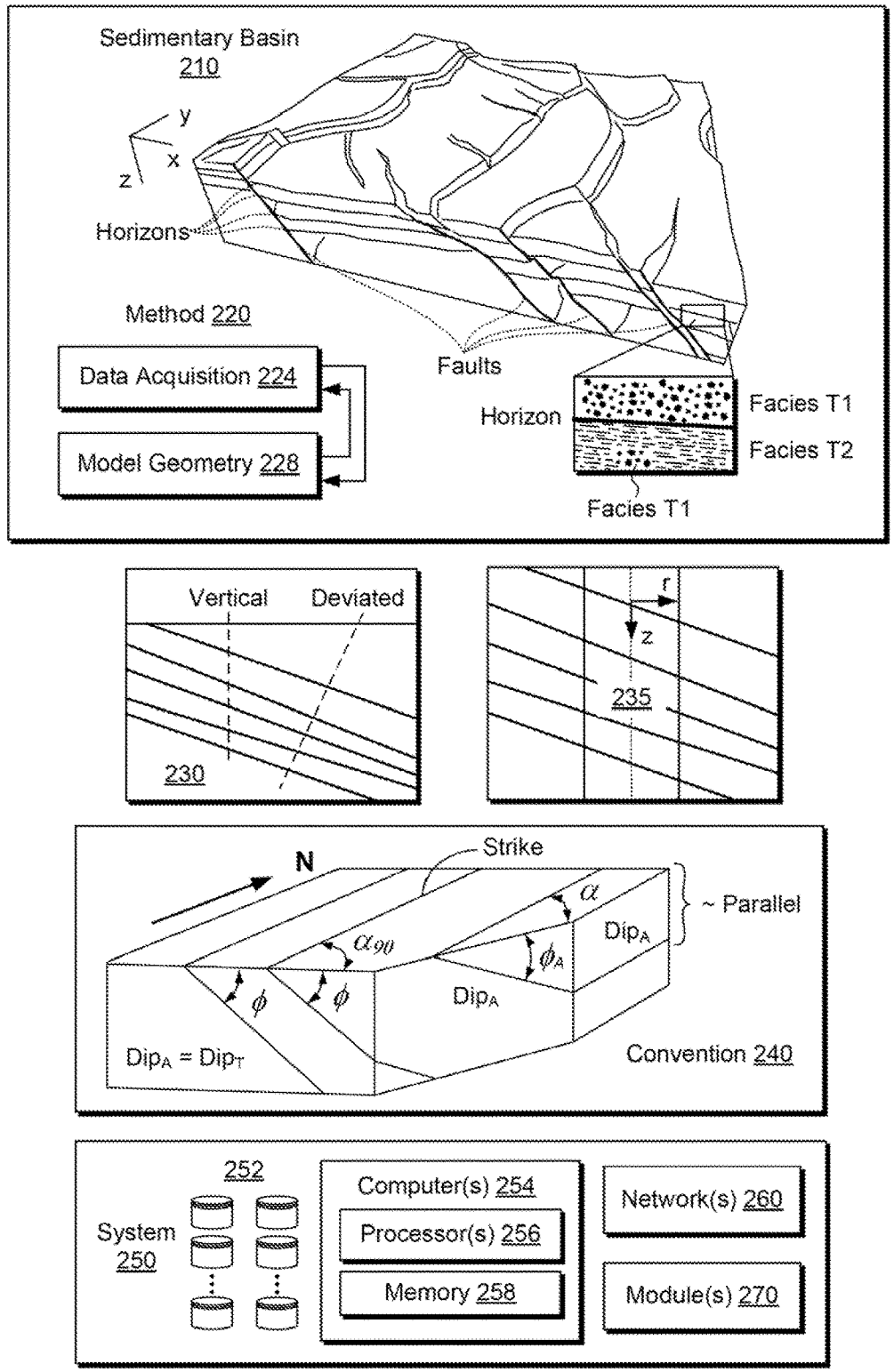
FIG. 2 illustrates an example of a sedimentary basin, an example of a method, an example of a formation, an example of a borehole, an example of a convention and an example of a system.

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, reservoir simulation, petroleum systems modeling, etc. may be applied to characterize various types of subsurface environments, including environments such as those of FIG. 1.

In FIG. 2, the sedimentary basin 210, which is a geologic environment, includes horizons, faults and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

A commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workfows.

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230.

As to the convention 240 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles φ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in any other direction except in the direction of true dip (see, e.g., $\phi_A$ as $Dip_A$ for angle $\alpha$); however, it is possible that the apparent dip is equal to the true dip (see, e.g., $\phi$ as $Dip_A = Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with $\phi$ as $Dip_A = Dip_T$ for angle $\alpha_{90}$ with respect to the strike). As indicated, dip observed in a cross-section in any other direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.).

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As shown in FIG. 2, the system 250 includes one or more information storage devices 252, one or more computers 254, one or more networks 260 and one or more modules 270. As to the one or more computers 254, each computer may include one or more processors (e.g., or processing cores) 256 and memory 258 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252.

As an example, the one or more modules 270 may include instructions (e.g., stored in memory) executable by one or more processors to instruct the system 250 to perform various actions. As an example, the system 250 may be configured such that the one or more modules 270 provide for establishing the framework 170 of FIG. 1 or a portion thereof. As an example, one or more methods, techniques, etc. may be performed using one or more modules, which may be, for example, one or more of the one or more modules 270 of FIG. 2.

As an example, phenomena associated with a geologic environment may be represented by one or more equations. For example, consider equations that represent compaction and pressure phenomena, equations that represent heat transfer, equations that represent hydrocarbon generation, equations that represent flow/migration of multiple components and multiple phases (e.g., water, oil and gas), etc. As an example, petroleum systems modeling can include variables (e.g., material properties) such as porosity ($\phi$) and compressibility of material (e.g., rock) (C), hydraulic potential of effective stress (u) (e.g., consider stress tensor $\sigma$, external load $\tau$, and fluid pressure, (p), thermal conductivity tensor ($\lambda_{i,j}$), density ($\rho$), heat capacity (c), fluid velocity tensor ($v_i$), permeability tensor ($k_{i,j}$), viscosity ($\nu$), mobility ($\mu$), Arrhenius rate constants ($k_r$), temperature (T), saturation (S), capillary pressure ($p_c$), and volumetric flow (q).

As an example, chemical compaction induced porosity loss as a function of temperature and effective stress may be included in an analysis. Some examples of variables may include one or more diffusion coefficients ($D_c$) where a diffusion flux occurs in response to a concentration gradient of a component or components ($c_i$). As an example, nonlinearities may be inherent in one or more equations or stem from dependencies (e.g., consider Arrhenius rate constant with respect to temperature, convection, etc.).

As an example, one or more variables may be anisotropic. For example, a tensor variable may differ depending on direction. Orientation of material with respect to gravity may also be a factor, for example, a material type (e.g., facies) may be compactable in a particular direction when acted upon by a load due to gravity. In such an example, permeability of the material may likewise be impacted due to its orientation with respect to gravity. As an example, gravity (G or g) may be included in an equation for pressure or buoyancy (e.g., water flow may depend on a difference between a pressure and a head pressure determined on the basis of a water density ($\rho_w$), gravity (G or g) and depth (z)).

While an equation may reference some dimensions (e.g., x, y, z), equations may be formulated in one, two or three dimensions in space, where time may be viewed as an additional dimension (e.g., 3D in space and 1D in time to provide a 4D formulation). As an example, one or more equations may account for transport of heat energy, for example, with respect to hydrocarbon generation (e.g., increasing or decreasing temperature and thereby altering the Arrhenius rate constant for rate of formation of a hydrocarbon with respect to time). As an example, a heat transfer equation may include a source term (Q), which may account for radioactive processes or other heat source/sink processes.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

Figure 3:
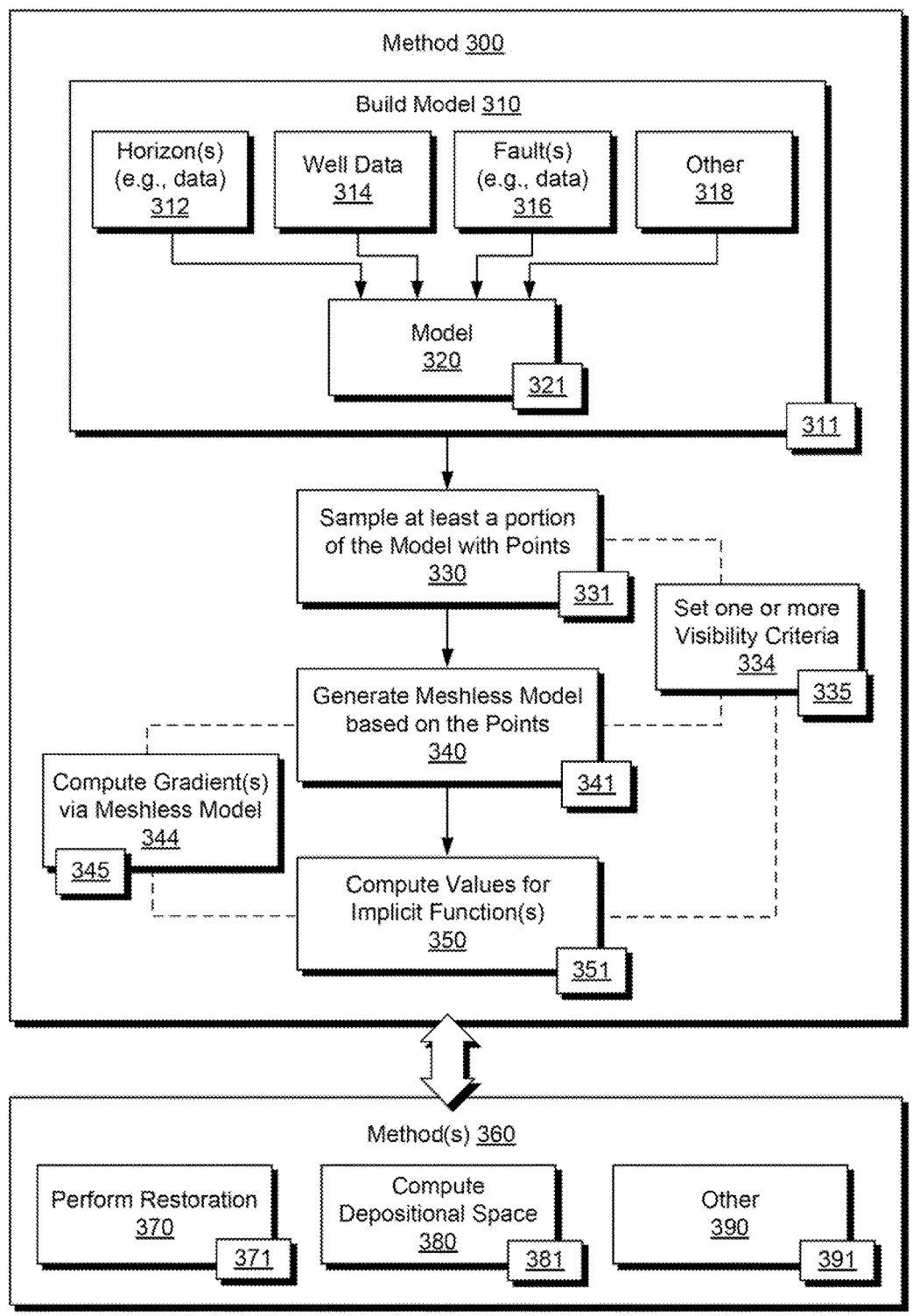
FIG. 3 illustrates examples of methods.

FIG. 3 shows an example of a method 300 that includes a build block 310 for building a model 320, a sample block 330 for sampling at least a portion of the model 320 with points and a generation block 340 for generating a meshless model based at least in part on the points. As shown in the example of FIG. 3, the method 300 may include a set block 334 for setting one or more visibility criteria, a computation block 344 for computing one or more gradients via a meshless model and/or a computation block 350 for computing values for one or more implicit functions (e.g., to match one or more horizons, etc.). As indicated by dashed lines, the method 300 may optionally include implementing one or more of the blocks 334, 344 and 350. As an example, the method 300 may include one or more loops, for example, for refinement of a meshless model.

In the example of FIG. 3, the build block 310 may include building the model 320, or a portion thereof, based in part on one or more of horizon data 312, well data 314, fault data 316 and other data 318 (e.g., fracture data, geobody data, etc.). As an example, the model 320 may include one or more meshes, for example, defined with respect to one or more spatial coordinates. As an example, data may be provided as to one or more characteristics of a geologic environment for present day, past and/or future (e.g., estimates, predictions, etc.). As an example, the model 320 may be a present day model (e.g., a model for a current geologic period of time).

As an example, the method 300 may include computing values for one or more implicit functions based at least in part on horizon data and, for example, setting one or more visibility criteria based at least in part on an isovalue of an implicit function that may represent a horizon. In such an example, the method 300 may include computing gradients using a meshless model subject to the one or more visibility criteria, for example, where nodes of the meshless model may exist on one side of a horizon and exist on another side of the horizon where respective domains of influence (e.g., support) for the nodes do not extend through the horizon (e.g., from one layer to another layer where the horizon may be an interface between the layers).

As an example, the method 300 may be associated with one or more methods 360. For example, a method may include a performance block 370 for performing restoration, a computation block 380 for computing a depositional space or another block 390 for performing one or more other actions. In such examples, at least a portion of the one or more methods 360 may be performed using at least a portion of a meshless model. As an example, a meshless model may provide for solving one or more equations such as, for example, one or more partial differential equations (PDEs), optionally with respect to time.

As an example, the method 300 may include receiving seismic data and interpreting seismic data, for example, as to horizons, faults, fractures, geobodies, etc. As an example, the method 300 may include receiving one or more interpreted horizon surfaces, for example, as spatially located data. As an example, the method 300 may include receiving well data, for example, data that may be optionally associated with one or more characteristics of material in a geologic environment (e.g., rock, fluid, etc.).

As an example, a model may include one or more meshes. As an example, a mesh may be a multidimensional mesh. As an example, a model may include a surface mesh. For example, consider a fault provided as a triangulated surface; noting that one or more other types of features in a geologic environment may be represented using a mesh.

As an example, a method may include sampling a portion of a model, for example, consider sampling a volumetric portion of a model that includes one or more horizons, one or more wells, one or more faults, etc. As an example, such sampling may generate a point cloud where at least a portion of the points therein may become nodes of a meshless model. As an example, where a model includes a feature that may "divide" a geologic environment (e.g., spatially), such a feature may optionally be used to set one or more visibility criteria. As an example, a visibility criterion may truncate a domain of influence for a node. For example, where a domain of influence is a disc, a visibility criterion may truncate the disc, where a domain of influence is a sphere (e.g., a "ball"), a visibility criterion may truncate the sphere, etc. As an example, a domain of influence may be defined using one or more parameters, optionally to form a domain that may be other than a disc or a sphere. For example, consider rectangular domains (e.g., or polyhedral domains), which as for the disc domains (e.g., or sphere domains), may be overlapping according to a meshless model. As an example, a domain of influence for a point may be elliptical, an ellipsoid, etc.

As an example, a meshless model may be used to compute one or more gradients with respect to at least a portion of the nodes of the meshless model. As an example, a gradient may be a spatial gradient, optionally a multidimensional spatial gradient. As an example, a gradient may be associated with a feature in a geologic environment, a characteristic of a geologic environment, a fluid in a geologic environment, etc.

As an example, a method may include constructing one or more implicit functions matching horizons and well data where one or more of the one or more implicit functions may be discontinuous at one or more faults (e.g., to honor fault throw). As an example, an implicit function or implicit functions may be discontinuous with respect to another type of feature of a geologic environment (e.g., a fracture, a geobody, etc.).

As an example, a method may include computing gradients using a meshless model of a geologic environment and computing implicit function values based at least in part on the computed gradients (see, e.g., the computation block 350).

As an example, a method may include computing gradients using a meshless model of a geologic environment and performing restoration of at least a portion of the geologic environment based at least in part on the computed gradients (see, e.g., the performance block 370).

As an example, a method may include computing gradients using a meshless model of a geologic environment and computing a depositional space that corresponds to a geological domain (e.g., of at least a portion of the geologic environment) based at least in part on the computed gradients (see, e.g., the computation block 380).

The methods 300 and 360 are shown in FIG. 3 in association with various computer-readable media (CRM) blocks 311, 321, 331, 335, 341, 345, 351, 361, 371, 381 and 391. Such blocks generally include instructions suitable for execution by one or more processors (or cores) to instruct a computing device or system to perform one or more actions. While various blocks are shown, a single medium may be configured with instructions to allow for, at least in part, performance of various actions of the method 300, one of the method 360, etc. As an example, a computer-readable medium (CRM) may be a computer-readable storage medium. As an example, the blocks 311, 321, 331, 335, 341, 345, 351, 361, 371, 381 and 391 may be provided as one or more modules, for example, such as the one or more modules 270 of the system 250 of FIG. 2.

As an example, a method may include restoration of structures in a multidimensional space (e.g., 2D and/or 3D spaces). As an example, a method may include computing a depositional space, which may be a computational space for performing one or more computations as to a geologic environment (e.g., optionally without using a background mesh). As an example, a method may include reconstruction of one or more horizons using one or more implicit functions (e.g., optionally without using a background mesh). As an example, a method may include modeling geobody deformation (e.g., salt deformation, etc.), for example, without using a background mesh (e.g., avoiding remeshing as associated with deformation). For example, a method may include modeling a salt surface of a salt structure and deformation of that surface. In such an example, a point sample around the salt structure may be dynamically changed according to results of the salt surface modeling.

As an example, a method may include using a depositional space technique to estimate one or more property distributions (e.g., property values) using a restoration technique (e.g., optionally without using a background mesh). Such a method may avoid construction and use of a background mesh, may avoid construction of a tetrahedral mesh, may avoid degenerate tetrahedral mesh elements, may provide for dynamic resampling (e.g., where high curvature may be observed, etc.), may avoid storage of node connectivity information (e.g., as in a structured mesh, an unstructured mesh, etc.), may be used with one or more optimization techniques (e.g., a critically damped Gauss-Seidel solver, shape matching as a pre-processor, etc.) and may be used with one or more constraints (e.g., to gently restore complex horizons, salt dome evolution when doing restoration, etc.).

As an example, a method may include implementing a meshless model in conjunction with a reconstruction technique that can reconstruct one or more horizons using one or more implicit functions.

As an example, a meshless model may include a moving least squares (MLS) formulation of equations. As an example, such a meshless model may substitute for at least a portion of a finite element method (FEM) model (e.g., a mesh-based model), at least a portion of a boundary element method (BEM) model (e.g., a mesh-based model), etc.

As an example, a meshless model may include one or more visibility criteria, for example, for incorporation of one or more discontinuities within an elastic solid (e.g., as part of a geologic environment). For example, a volume of interest may include preexisting fault surfaces and horizons (e.g., discontinuities) that may be represented as surfels (surface elements). In such an example, the volume of interest may be sampled with phyxels (physical elements), for example, using an octree. As an example, an octree may be a tree data structure in which an internal point may be associated with, for example, eight other points. As an example, an octree technique may be applied to partition a three dimensional space by recursively subdividing it into eight octants. As an example, in a two dimensional space, a quadtree may be implemented (e.g., an octree may be considered to a three-dimensional analog of a quadtree) to form quadrants.

As an example, where a volume of interest is sampled with phyxels, individual phyxels may be attributed a respective mass $m_i$ (e.g., a fixed mass) and a respective normalized polynomial kernel, for example, with a distance r (e.g., a radius in space). In such an example, derivatives of a displacement field at an individual phyxel "I" (e.g., phyxel node "I") may be evaluated using displacement of neighboring phyxels and a moving least squares (MLS) formulation, for example, with a linear basis function. For example, consider minimizing error of an approximation to arrive at a moment matrix (see, e.g., FIG. 5). Through an evaluation of derivatives, a Jacobian matrix may be computed from which, for example, strain and stress may be deduced (e.g., via Hooke's law, etc.). In such an approach, one or more surface discontinuities (e.g., features in a geologic environment) may be treated using one or more visibility criteria (e.g., transparency, diffraction, etc.).

Figure 4:
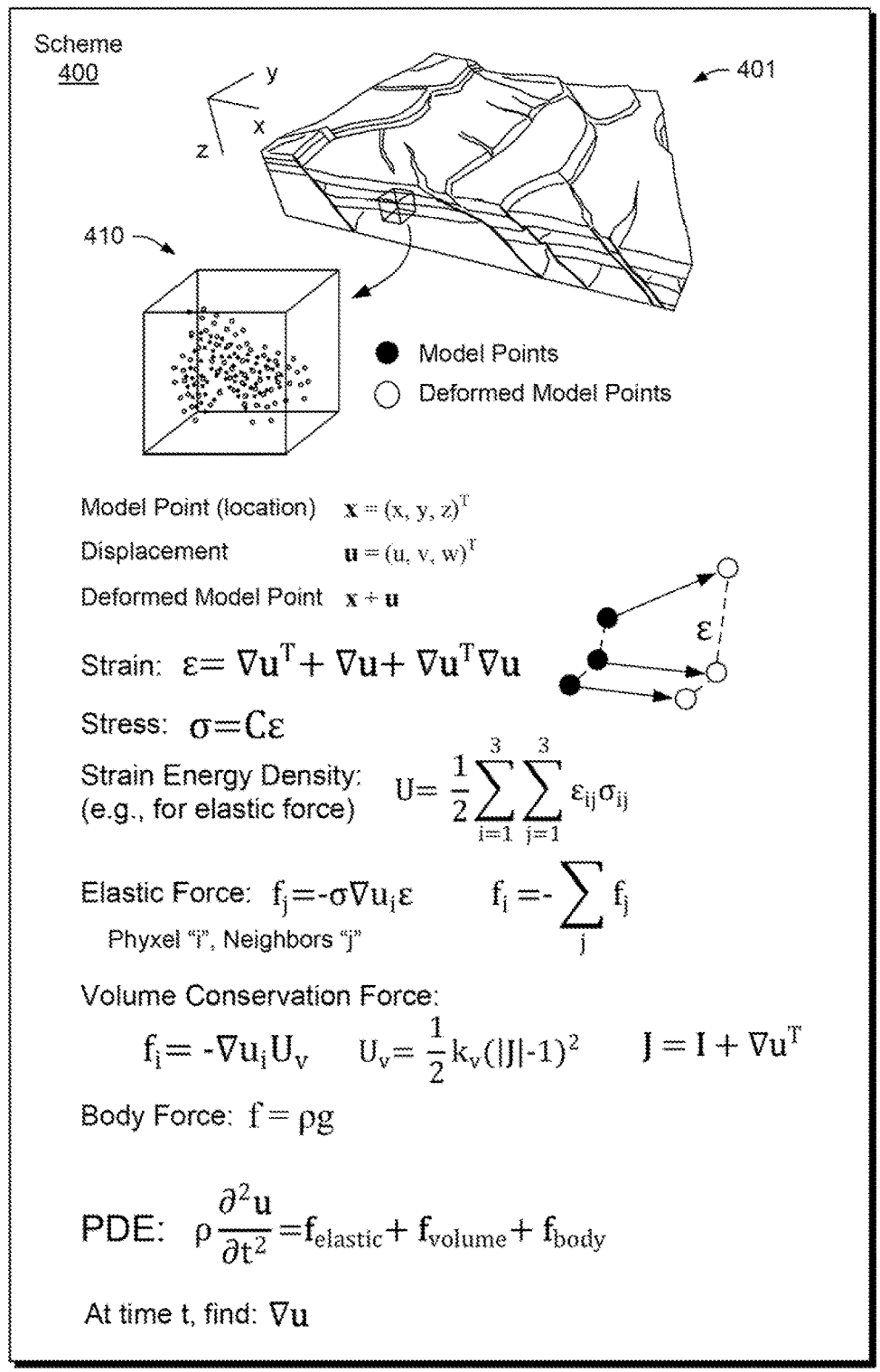
FIG. 4 illustrates an example of a scheme for meshless representation of at least a portion of a model of a geologic environment.

FIG. 4 shows an example of a scheme 400 that may be implemented to formulate an equation such as, for example, a partial differential equation (PDE). As shown in the example of FIG. 4, a portion of a model of a geologic environment 401 may be sampled 410 to include model points, which may be, for example, phyxels (e.g., nodes). As an example, a partial differential equation may describe how forces may act to deform the portion of the model with respect to time such that the model points (e.g., points of a meshless model) become deformed model points (e.g., points of a deformed meshless model).

As illustrated in FIG. 4, locations of the model points may become displaced due to force and may do so with accompanying strain, which may be represented via an equation that includes $\nabla u$, which is a tensor field (e.g., gradient of a displacement vector field u). As an example, a tensor field may be a generalization of a scalar field or vector field that may assign, for example, respectively, a scalar or vector to individual points in a space. In the example of FIG. 4, the tensor field $\nabla u$ is shown as being the gradient of a displacement vector field a (e.g., for points x in a space) noting that a space may be defined in one or more dimensions and with respect to one or more types of coordinate systems.

As shown in FIG. 4, stress may be represented by strain and, for example, a rank four tensor C, which for an isotropic material may include Young's Modulus and Poisson's Ratio as independent coefficients. As an example, C may be appropriated formulated for an anisotropic material, etc.

As an example, elastic forces may be formulated via strain energy density and cast in terms of phyxels (e.g., an individual phyxel "i" and neighboring phyxels "j"). In the example of FIG. 4, an equation for elastic force is shown, for example, under an assumption of material in a sampled portion being Hookean (e.g., approximated by Hooke's law). Additional forces may include a volume conservation force and a body force.

As an example, the concept of strain may be used to evaluate how much a given displacement differs (e.g., locally) from that of a rigid body displacement. In the example of FIG. 4, strain is given in the form of Green's strain tensor (e.g., consider the quadratic Green-Saint-Venant strain tensor), which may provide a measure of linear elongation (e.g., normal strain) and alteration of angles (e.g., shear strain); however, it may be null for a volume inverting displacement field. In other words, volume inversion may not appropriately result in restoring elastic body forces. In the example of FIG. 4, to appropriately account for such forces, a volume conservation force may be included, for example, formulated in terms of a tensor field and, for example, a Jacobian "J" of a mapping from phyxel locations to displaced phyxel locations. As shown, the volume conservation force includes an energy term $U_v$ that may act to penalize deviations of the determinant of the Jacobian "J" (e.g., |J|) from positive unity (e.g., deviations from a right handed volume conserving transformation).

In the example of FIG. 4, an example of a body force is given in terms of density ($\rho$) and gravity (g). As mentioned, a PDE may be formulated with respect to a displacement field u in terms of forces. As an example, such a PDE may be solved by computing the tensor field $\nabla u$ at one or more times.

As an example, a method may include sampling a volume at a finite number of point locations, for example, without connectivity information (e.g., to alleviate volumetric mesh generation). In such an example, simulation quantities (e.g., location $x_i$, density $\rho_i$, deformation $u_i$, velocity $v_i$, strain $\varepsilon_i$, stress $\sigma_i$, force $f_i$, etc.) may be "carried" by physically simulated points (e.g., nodes, which may be phyxels). As an example, an individual phyxel may include a position x, in space, which, at a point in time, may be referred to as having a reference shape; whereas, at another point in time, it may be at a deformed location $x_i+u_i$ and hence be referred to as having a deformed shape.

Figure 5:
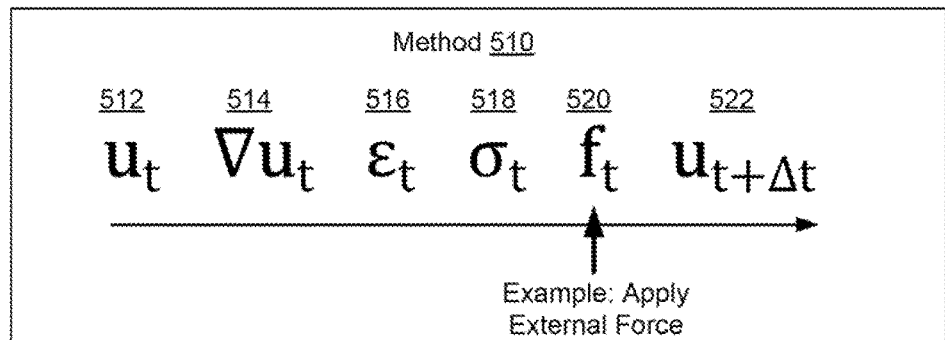
FIG. 5 illustrates an example of a method.
Figure 5:
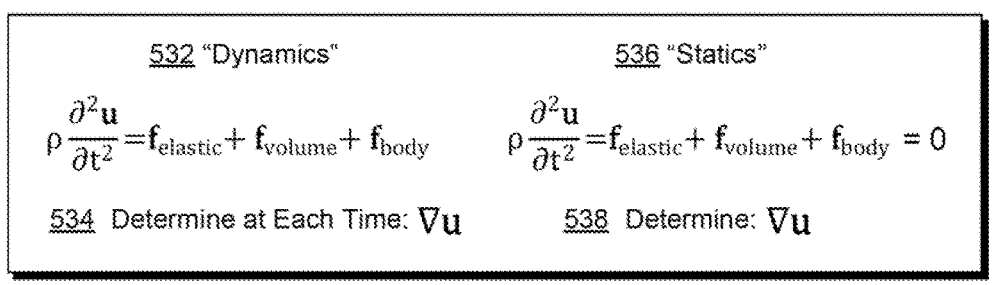
Figure 5:
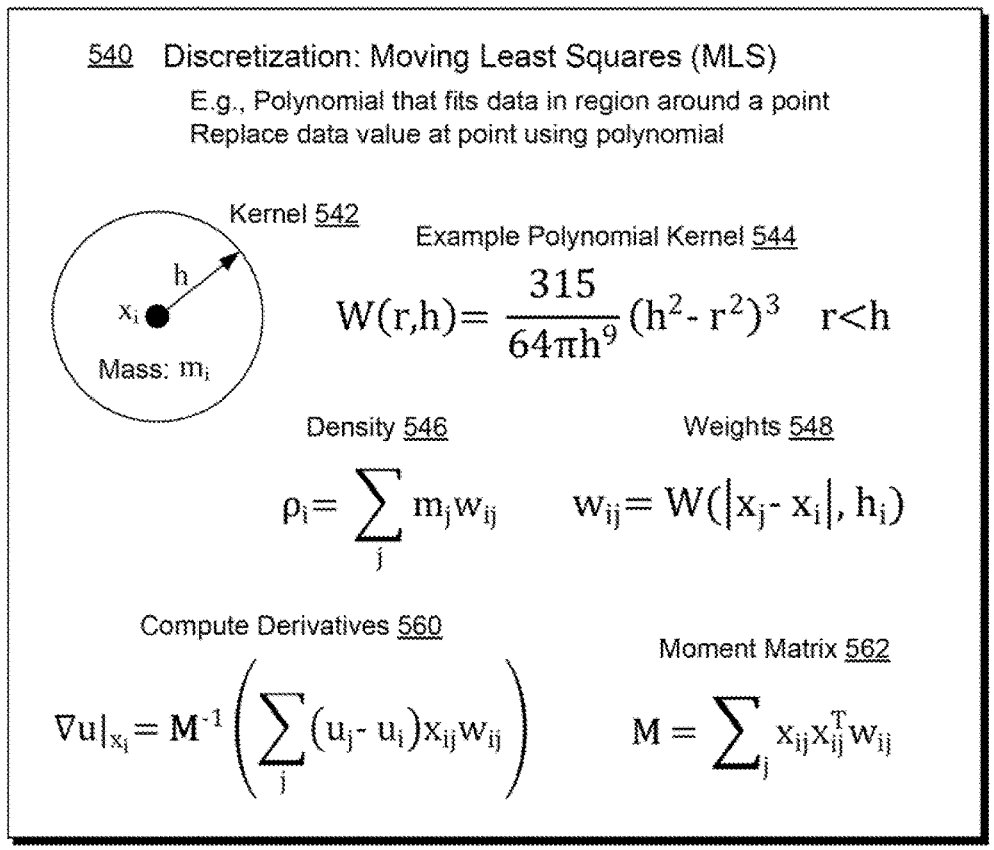

FIG. 5 shows an example of a method 510 that includes various actions with respect to time. For example, the method 510 may include providing displacements at a point in time (e.g., a displacement field $u_t$) 512, determining derivatives of the displacements (e.g., a tensor field $\nabla u$) 514, determining strains 516, determining stresses 518, determining forces 520 (e.g., optionally applying one or more forces such as, for example, an external force) and performing an integration to update the displacements to a new point in time 522 (e.g., t+$\Delta$t).

In the example of FIG. 5, a PDE may be given where a method such as the method 510 includes finding the tensor field at individual times. For example, a method may include determining dynamics of a geologic environment. As shown in FIG. 5, an example PDE 532 may be part of a formulation that includes determining values for a tensor field $\nabla u$ at points in time 534 (e.g., via a method such as the method 510). As another example, a method may include determining statics of a geologic environment. As shown in FIG. 5, an example PDE 536 may be part of a formulation that includes determining values for a tensor field 538 where a force balance (e.g., a sum of forces) may be assumed to be zero (e.g., approximately zero in a numerical, digital computational sense, which may be set as a limit or error parameter). As an example, a method may include a static formulation where, for example, the method, a workflow, etc. may include determining one or more implicit surfaces, performing restoration, computing a depositional space (e.g., which may be a type of restoration), etc.

As an example, a method may be directed to mechanics (e.g., classical mechanics), which may involve statics and/or dynamics. Mechanics may aim to model and understand behavior of physical material (e.g., bodies, etc.) when subjected to forces or displacements and, for example, subsequent effects of the physical material on a neighboring environment. For a geologic environment, a neighboring environment may be internal, external or internal and external to physical material that is modeled. As an example, physical material may include strata (e.g., of one or more types of material), geobodies (e.g., salt formations, etc.), reservoirs (e.g., of single or multiphase materials), etc.

As an example, statics may include analysis of loads (e.g., force, torque, moments, etc.) on physical materials that may be, for example, assumed to be "static equilibrium". As an example, static equilibrium may be defined as a state where relative positions of material(s) in a system do not vary over time or, for example, where components and structures may be assumed to be at an approximately constant velocity. As an example, when in static equilibrium, a system may be considered to be either at rest, or having its center of mass moving at an approximately constant velocity.

As an example, by Newton's first law, net force and net torque (e.g., moment of force) on portions of a system may be assumed to be approximately zero, which may be an operative constraint on a formulation. Under such an assumption, one or more quantities such as, for example, stress, pressure, etc. may be determined (e.g., computationally using a numerical model). As an example, a condition that net forces equal zero may be considered a first condition for equilibrium and, for example, another condition that net torque equals zero may be considered a second condition for equilibrium.

As an example, dynamics may involve relationships between motion of material(s) (e.g., bodies, etc.) and causes thereof such as, for example, forces acting thereon and/or properties thereof (e.g., consider mass, moment of inertia, etc.). As an example, dynamics may involve or be formulated as one or more of Newtonian mechanics, Lagrangian mechanics and/or Hamiltonian mechanics.

As an example, a method may involve geomechanics. For example, a method may include formulating equations and solving such equations to determine one or more values associated with physical phenomena. As an example, a method may include determining values associated with stress, modulus of elasticity, leak-off coefficient, Poisson's ratio, etc. As an example, a method may include determining values associated with formation porosity, permeability, pressure, etc. As an example, a method may include receiving data, directly or indirectly, where such data may be acquired via one or more techniques (e.g., coring, logs, well testing, fracturing, seismology, etc.).

As an example, equations may be coupled mathematically (e.g., computationally). As an example, a system of equations may include a PDE such as, for example, a portion of the PDE 532 or a portion of the PDE 536. In such an example, the PDE may be coupled to other equations. As an example, such other equations may include one or more equations associated with physical phenomena germane to petroleum systems.

As an example, a petroleum system may be is a geologic system that encompasses hydrocarbon source rocks and related oil and gas, and which includes geologic elements and processes germane to existence of hydrocarbon accumulation. As an example, a dynamic model may include equations for determining a record of one or more of generation, migration, accumulation and loss of oil and gas in a petroleum system through geologic time. As an example, an equation may be associated with mechanical phenomena, chemical phenomena, nuclear phenomena (e.g., in a classical formulation, a quantum formulation, etc.), fluid phenomena, phase-change phenomena, etc.

As an example, a method may include structural restoration that includes determining at least one shape of at least one geologic feature (e.g., structure, geobody, layer, etc.) at at least one paleo time. Such a method may include solving one or more equations that can model overthrusting, faulting, etc. As an example, a method may include backstripping, for example, based at least in part on one or more of mass balance of material and volume balance of material. As an example, a method may include structural restoration in association with basin modeling, for example, as one or more shapes (e.g., of layers, faults, bodies, etc.) determined via structural restoration may be one or more inputs for basin modeling (e.g., inputs to a basin model). As an example, a method may include structural modeling, geomechanics, tectonics, etc. As an example, a method may include modeling of stresses and strains. Such a method may further include modeling fault properties, fracturing, lateral effects on compaction of material, etc.

As an example, basin modeling may include dynamic forward modeling of one or more geological processes in a sedimentary basin with respect to a geological time span. As an example, basin modeling may include equations for deposition, pore pressure calculations and compaction, heat flow analysis and temperature determinations, kinetics of calibration parameters such as vitrinite reflectance or biomarkers, modeling of hydrocarbon generation, adsorption and expulsion processes, fluid analysis, and migration.

As an example, a method may include modeling material such as salt. For example, one or more salt bodies and/or layers may be modeled (e.g., forward, backward, statically, etc.). As an example, a method may include reconstructing material (e.g., at least with respect to position) based on calculated lithostatic pressures and/or total stresses at one or more material boundaries. In such an example, consider salt moving along a gradient of lowest mechanical resistivity. As an example, occurrence and timing of one or more salt windows may be associated with petroleum migration and pressure development, for example, as subsalt fluids and pressures may be released afterwards. As an example, one or more values determined by a method may be transmitted to equipment that may be controlled, positioned, etc. based at least in part on such one or more values. For example, consider drilling equipment, data acquisition equipment, etc.

In FIG. 5, an example of a discretization technique 540 is illustrated, which corresponds to a moving least squares (MLS) approach. In such an example, a polynomial may be used to fit data in a region about a point (e.g., a node, which may be a phyxel), for example, where a data value at the point may be replaced using the polynomial.

As an example, a point $x_i$ (e.g., a node, which may be a phyxel) may include a domain of influence, which may be represented as a kernel 542, for example, having a parameter "h" that defines an extent of the domain of influence (e.g., support) for the point $x_i$, which may be assigned a mass $m_i$. The kernel 542 may be represented by an equation, which may be or include a polynomial such as the example polynomial kernel 544. As indicated in the example of FIG. 5, the polynomial kernel 544 includes values for r with the kernel 542 where r is less than h; otherwise, the value may be null (e.g., for r equal to or greater than h). Such a kernel may be normalized and, for example, have units of reciprocal volume.

As an example, a density formulation 546 may depend on a sum of point masses and weights where a weight formulation 548 depends in part on a polynomial kernel such as the polynomial kernel 544. As an example, for a given mass, which may be fixed for a point, density and volume may change, for example, depending on deformation (e.g., plastic deformation, etc.).

In the example of FIG. 5, an example of a formulation 560 is illustrated for computing derivatives based at least in part on a moment matrix 562, which may be represented in part by weights (see, e.g., the weight formulation 548). In the example formulation 560, dimension u is shown, noting that the moment matrix M (see, the formulation 562) may be a 3-by-3 system matrix that may be, for example, computed (e.g., optionally pre-computed), inverted and used for the computation of derivatives of v and w (see, e.g., the displacement locations u, v and w for deformed points in the scheme 400 of FIG. 4).

As an example, if a number of phyxels within a support radius h in a neighborhood of a phyxel i is less than 4 (e.g., including phyxel i) or, for example, if these phyxels are co-planar or co-linear, there may be a risk of the moment matrix M being singular (e.g., impacting ability to invert). As an example, one or more criteria may be placed on sampling (e.g., a coarseness criterion, a co-linearity criterion, a co-planar criterion, etc.) and/or re-sampling may be implemented (e.g., to reduce risk or otherwise avoid singularity). As an example, an inversion technique may include singular value decomposition (e.g., to avoid problems with singular or badly conditioned moment matrices).

In the example of FIG. 5, the formulation 560 can provide for computation (e.g., for an individual simulated phyxel i) of spatial derivatives of a deformation field at a phyxel location $x_i$ based on displacement vectors $u_j$ of neighboring phyxels j. In turn, the Jacboian $J_i$, strain $\varepsilon_i$, and stress $\sigma_i$ at phyxel i may be computed as well as forces (see, e.g., the method 510). For example, the strain energy $U_i$ from $\varepsilon_i$, $\sigma_i$, and the volume $v_i$ and the elastic forces as the negative gradient of $U_i$ with respect to the displacement vectors.

As to time integration, as an example, elastic strain energy $U_i$ of a phyxel may be in terms of energy because of multiplication by a phyxel's rest volume $v_i$. Thus, the elastic force derived from it may be a force, which may be used, for example, to determine an acceleration of a phyxel (e.g., $d^2u_i/dt^2 = a_i = f_i/m_i$). As an example, time integration may be via an explicit scheme or an implicit scheme. As an example, time integration may implement a leap-frog scheme. As an example, a method may include simulating behavior with respect to time, restoring material to an earlier time, etc.

As an example, a moving least squares (MLS) formulation may be implemented as part of a meshless model. As an example, an approximation may be given as follows with respect to basis functions "p":

$$u^h(x) = \sum_{i=1}^{m} p_i(x) a_i(x) \equiv p^T(x) a(x)$$

where m is the number of terms in the basis, $p_i(x)$ are monomial basis functions and $a_i(x)$ are their coefficients, which as indicated, are functions of the spatial coordinate x. As an example, linear bases may be based in part on x, $x^2$, y, $y^2$, etc. with respect to spatial coordinates.

As an example, a local approximation may be given as follows:

$$u^h(x, \bar{x}) = \sum_{i=1}^{m} p_i(\bar{x}) a_i(x) \equiv p^T(\bar{x}) a(x)$$

In such an example, the coefficients may be obtained by performing a weighted least square fit for the location approximation, which may be obtained by minimizing the difference between the local approximation and the function, for example, to yield a quadratic formulation that includes a weighting function with respect to compact support.

As an example, the approximation may be expressed as:

$$u^h(x) = \sum_{I=1}^{n} \phi_I^k(x) u_i$$

where k is the order of the polynomial basis and where shape functions may be given as follows:

$$\phi^k = [\phi_1^k(x) \ldots \phi_n^k(x)] = p^T(x) M^{-1}(x) B(x)$$

Thus, shape functions may be formulated in terms of the moment matrix and polynomial basis functions where the moment matrix include weights that are dependent on the polynomial basis functions (e.g., polynomial kernel); noting that the moment matrix M (e.g., as directly above) may be represented, alternatively, using A.

As an example, a method may implement one or more of various types of polynomial basis functions, polynomial kernels, shape functions, etc. FIG. 5 shows the example polynomial kernel 544; noting that other types may include exponential, cubic spline, quartic spline, a so-called SPH spline, angle based polynomials (e.g., cosine, sine, etc.), etc. As an example, a polynomial kernel may be defined with respect to a support dimension (e.g., a radius of a disc, a radius of a sphere, dimensions of an ellipse, a dimension of a polygon, dimensions of a polygon, etc.). Such polynomial kernels may be of a desired degree of continuity (e.g., $C^N$, where N is an integer).

As an example, a node such as a phyxel may be defined with respect to a polynomial kernel and a support dimension or support dimensions for a domain of influence of the node. As an example, a domain of influence for a node may overlap with domains of influence of other nodes. As an example, a domain of influence of a node may be truncated or otherwise subject to one or more criteria, for example, to handle a discontinuity in a model of a geologic environment. As mentioned, as an example, one or more visibility criteria may be used to account for one or more boundaries in a meshless model, for example, consider a boundary of a fault, a fracture, a horizon, etc.

As an example, a meshless model may include phyxels and surfels that may be associated with corresponding nodes, which may be sampled points of a model of a geological environment. As an example, one or more features of a model of a geologic environment may be represented as surfels. As an example, one or more features of a model of a geologic environment may be modeled using a mesh in conjunction with meshless representations of the model. For example, a surface that corresponds to a discontinuity may optionally be represented by a triangulated mesh while regions on one side or both sides of the surface may be represented meshlessly.

Figure 6:
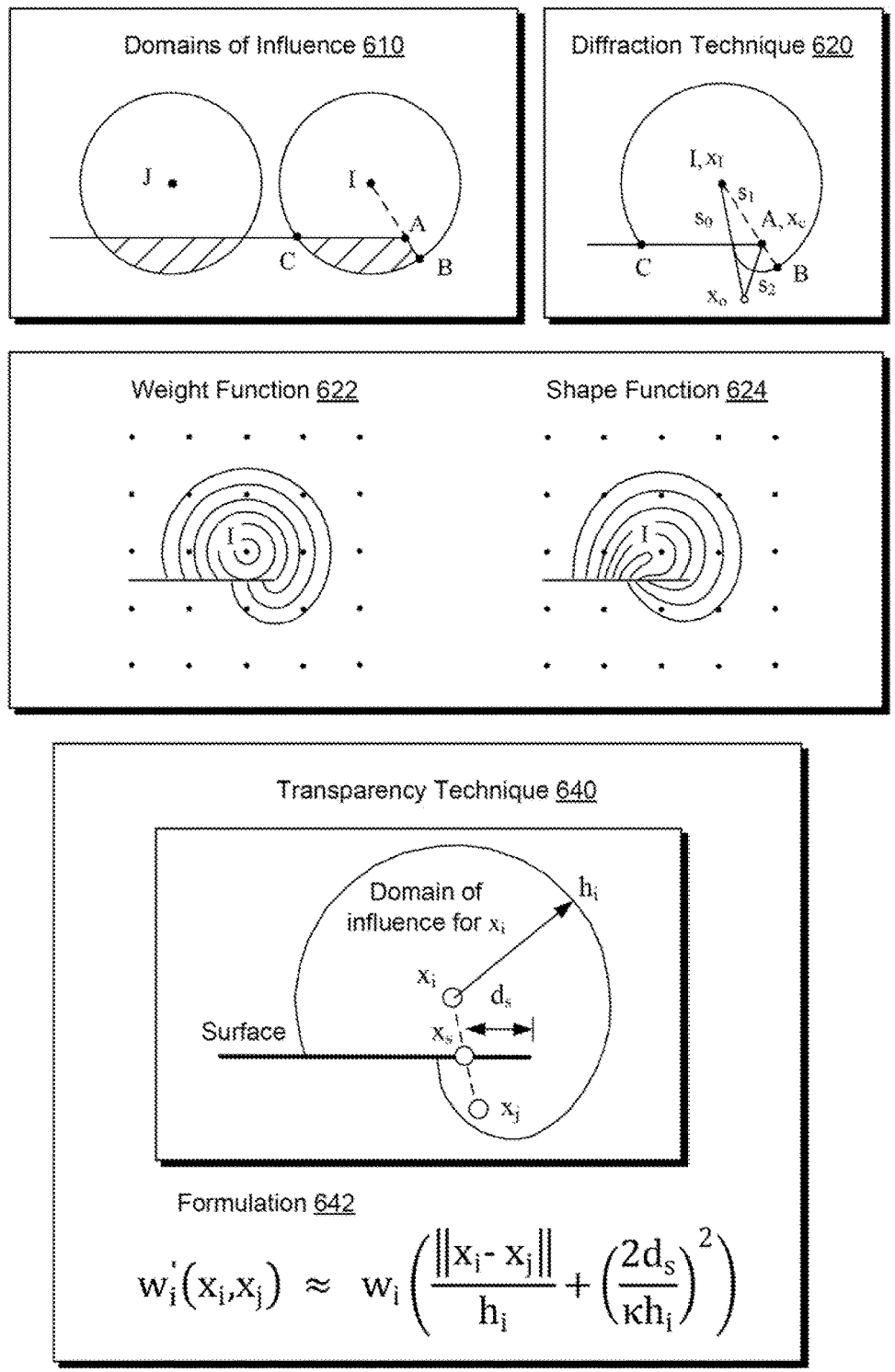
FIG. 6 illustrates examples of visibility criteria.

As explained above, as an example, a formulation may be defined at least in part by a weight function and at least in part by a shape function, which may depend on the weight function. FIG. 6 shows various examples of visibility criteria that may be applied and that may alter a weight function and thereby alter a shape function.

FIG. 6 shows examples of domains of influence 610 for a node J and a node I with respect to a line, which may be a discontinuity; noting that the domains of influence may be three-dimensional and, for example, the line may be associated with a surface (e.g., or surfaces). As shown, for the node I, the discontinuity, as represented by the line, has a corner or edge within the domain of influence of I. As an example, a visibility criterion may be applied to alter the domain of influence of I such that a portion below the line is removed from consideration.

In FIG. 6, a graphical representation 620 corresponds to a diffraction technique. The diffraction technique may treat a line of discontinuity as being opaque (e.g., as a visibility criterion) and may consider a length of a ray having a path that passes around a corner of the discontinuity. For example, the graphical representation 620 shows a point $x_0$ that is excluded from the domain of influence of $x_1$. As an example, a weight function may be formulated as follows:

$$s(x) = \left(\frac{s_1 + s_2(x)}{s_0(x)}\right)^\lambda s_0(x)$$

where $\|s_0(x)\| = \|x - x_1\|$, $s_1(x) = \|x_c - x_1\|$, $s_2(x) = \|x - x_c\|$, as shown in FIG. 6.

FIG. 6 also shows examples of contour plots 622 and 624 for a weight function and for a shape function, respectively, for a diffraction technique.

In FIG. 6, a graphical representation 640 of an example of a transparency technique is illustrated along with an example of a formulation 642. As an example, for a transparency technique, a weight function may be smoothed around a corner (e.g., a tip) of a discontinuity by endowing the surface, or line, of discontinuity with a varying degree of transparency. At the corner, the line of discontinuity may be considered to be transparent and transparency may diminish directionally away from the corner of the discontinuity. In such an example, when a ray from an evaluation point $x_j$ to the node $x_i$ intersects a line of discontinuity, a weight may be modified (e.g., according to a formulation such as the formulation 642).

Figure 7:
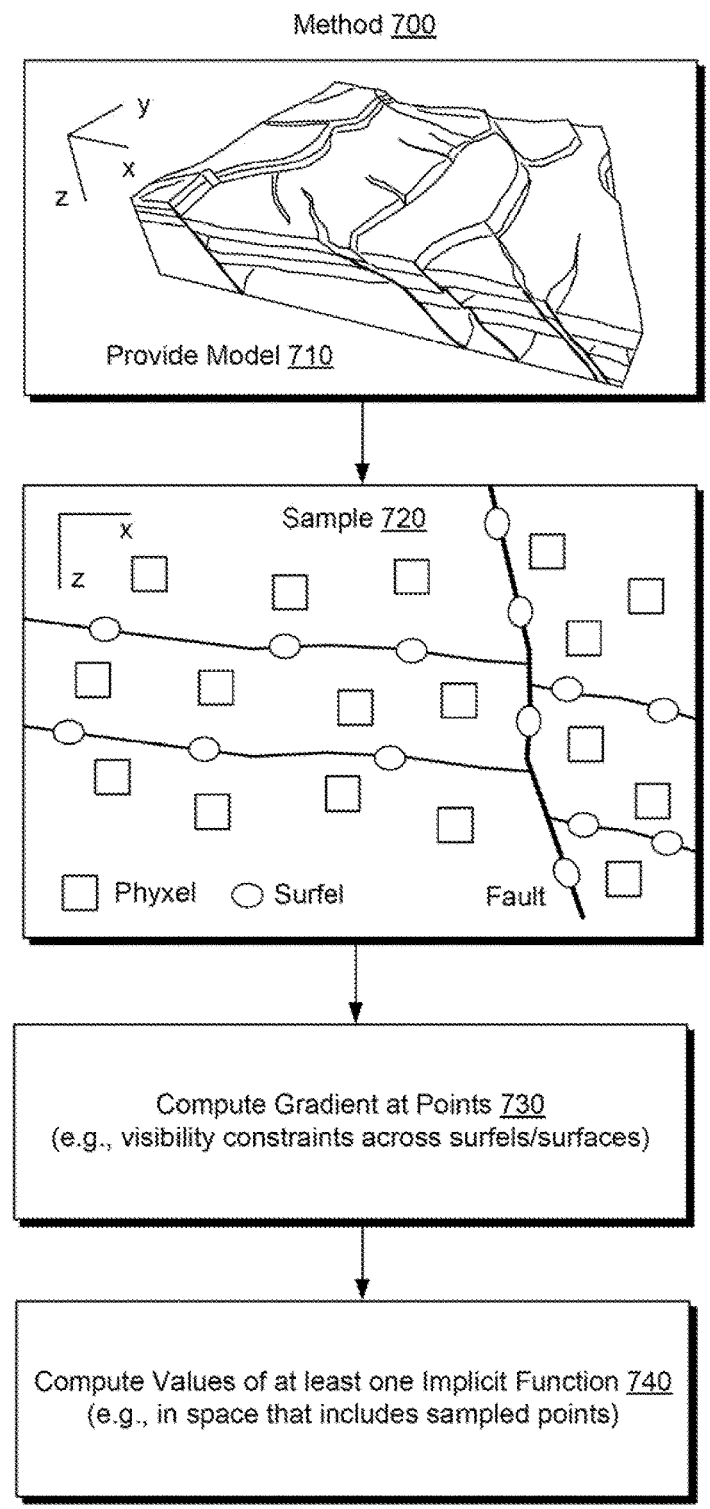
FIG. 7 illustrates an example of a method.

FIG. 7 shows an example of a method 700 that includes a provision block 710 for providing a model of a geologic environment, a sample block 720 for sampling at least a portion of the model, a compute block 730 for computing gradients at points (e.g., at least some of the sampled points) and a computation block 740 for computing values of at least one implicit function (e.g., in a space that includes at least some of the sampled points).

In the example of FIG. 7, the sample block 720 may sample points where various points may correspond to phyxels and where various points may correspond to surfels. For example, a horizon may be represented at least in part by surfels, a fault may be represented at least in part by surfels, a fracture may be represented at least in part by surfels, a geobody may be represented at least in part by surfels, etc. In the example of FIG. 7, phyxels may be disposed in one or more regions where such regions may be separated by one or more discontinuities. In such an example, one or more visibility criteria may be applied with respect to one or more of the one or more discontinuities.

As an example, a method may include computing displacements of surfels. For example, consider the following formulation for $u_{sfl}$, a surfel displacement vector:

$$u_{sfl} = \frac{1}{\sum_i \omega(r_i)} \sum_i \omega(r_i)(u_i + \nabla u_i^T (x_{sfl} - x_i))$$

$$\text{where } \omega(r_i) = \omega(\|x_{sfl} - x_i\|) = e^{\frac{-r_i^2}{h^2}}$$

is a Gaussian weighting function and where $u_i$ are the displacement vectors of phyxels at $x_i$ within a distance h to $x_{sfl}$.

As an example, a method may include computing displacements of surfels where the surfels correspond to a portion of a model of a geologic environment such as, for example, a portion of the model that may be a horizon, a fault, a fracture, a geobody, etc. As an example, a surface may correspond to an isovalue of an implicit function. As an example, such a surface may be modeled using a meshless approach using nodes that correspond to surfels. In such an example, positions (e.g., displacements) of the surfels may optionally be computing based at least in part on positions (e.g., displacements) of phyxels, which may be proximate to the surface (e.g., as part of a meshless model).

As mentioned with respect to FIG. 3, as an example, a meshless technique may be applied for performing restoration (e.g., structural restoration, etc.).

As an example, for basin and petroleum systems modeling, a method may include determining layer thicknesses of sediments at their respective times of deposition. Such a method may include reconstruction of depositional thicknesses of multiple individual sedimentary layers by backstripping a given present day multilayer geometry. As an example, reconstruction of depositional thickness can include decompacting a layer from a given present day thickness to a depositional thickness, for example, based on input of estimates for present day porosity and hydrostatic pore-pressure for that layer, where such estimates have some amount of error, uncertainty, etc. Based on decompaction of multiple layers to their respective historical times, a forward simulation in time may be performed, for example, to arrive at a calculated present day geometry for the multiple layers (e.g., as compacted over time) along with calculated present day porosities for the multiple layers.

As an example, a forward simulation in time may include performing a simulation based at least in part on a meshless model. For example, such a meshless model may include one or more partial differential equations that may account for forces that act to displace material with respect to time. As an example, displacement of material may be tracked via nodes, which may be, for example, phyxels, surfels or a combination of phyxels and surfels.

As an example, a single backstripping and forward simulation cycle may provide calculated porosity values that are improved when compared to the estimated porosity values that were used for the backstripping. To further improve porosity values, the calculated porosity values (e.g., predicted porosity values) may be provided as inputs to backstripping of a subsequent backstripping and forward simulation cycle. As an example, to yet further improve porosity values, one or more additional cycles may be performed. Where multiple backstripping and forward simulation cycles are performed, it may be referred to as an "optimization" procedure. Such an optimization procedure may include a number of cycles, for example, to arrive at a calculated (e.g., predicted) present day geometry of a sedimentary basin that appears sufficiently dose to an actual present day geometry of the sedimentary basin. Over multiple cycles, results from such an optimization procedure tend to converge.

As to backstripping and forward simulation cycles in a certain optimization procedure, the number of nodes may be fixed, for example, per sampling of a given sedimentary basin model (e.g., built based on seismic and optionally other types of data). In such an optimization procedure, the time to perform each of the cycles may be approximately constant. For example, if each cycle takes about X hours to perform then a three cycle optimization procedure may be expected to take about 3X hours to perform.

As an example, to reduce total time of an optimization procedure, a method may include utilizing a hierarchy of successively refined nodes for cycles of the optimization procedure (e.g., optionally via resampling). For example, given a meshless model with N nodes, a first cycle of an optimization procedure may use N/2 nodes. In such an example, a last cycle may increase the number of nodes, for example, to N nodes such that final results of the optimization procedure align with the given meshless model (e.g., a one-to-one nodal correspondence). As mentioned, nodes and corresponding domains of influence may be determined according to one or more criteria (e.g., as to overlap, etc.).

Basin and petroleum systems modeling may assess generation, migration, and accumulation of hydrocarbons. Quantities such as pore pressure, geomechanical stresses and strains, temperature, and fluid potentials can assist understanding of a sedimentary basin and provide for an estimation of hydrocarbon generation, migration, and accumulation. These quantities may be described via formulations of equations that include partial differential equations (PDEs). A spatial distribution and evolution through geological time of such processes may be a goal of basin modeling.

Figure 8:
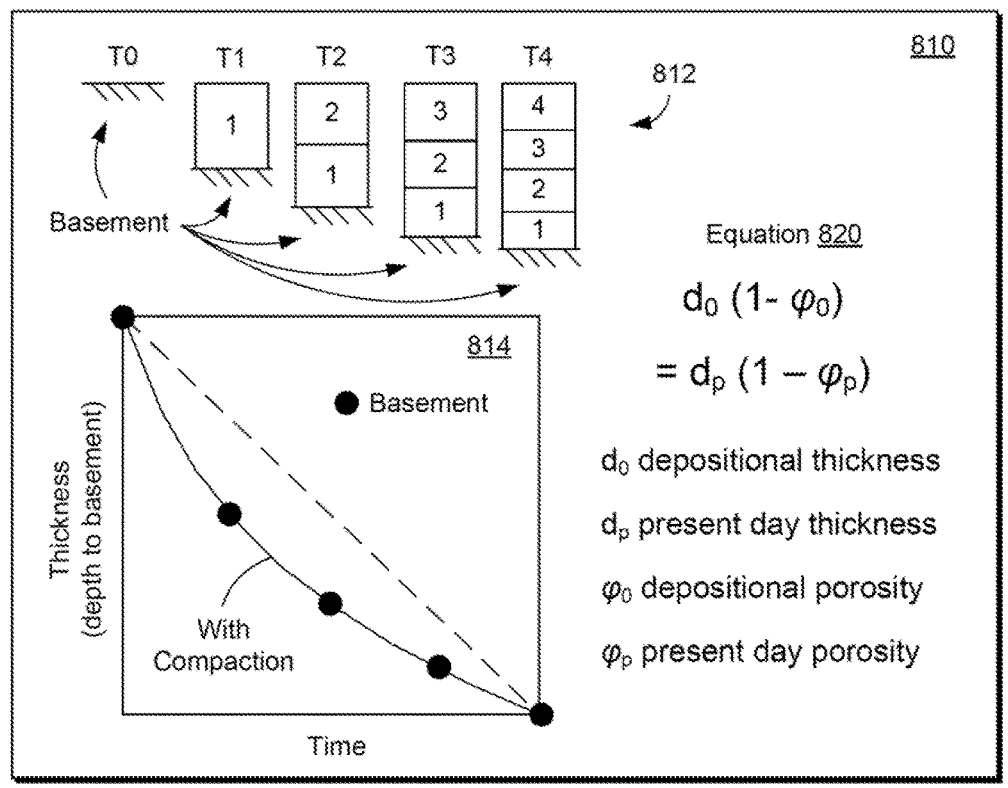
FIG. 8 illustrates an example of a method.
Figure 8:
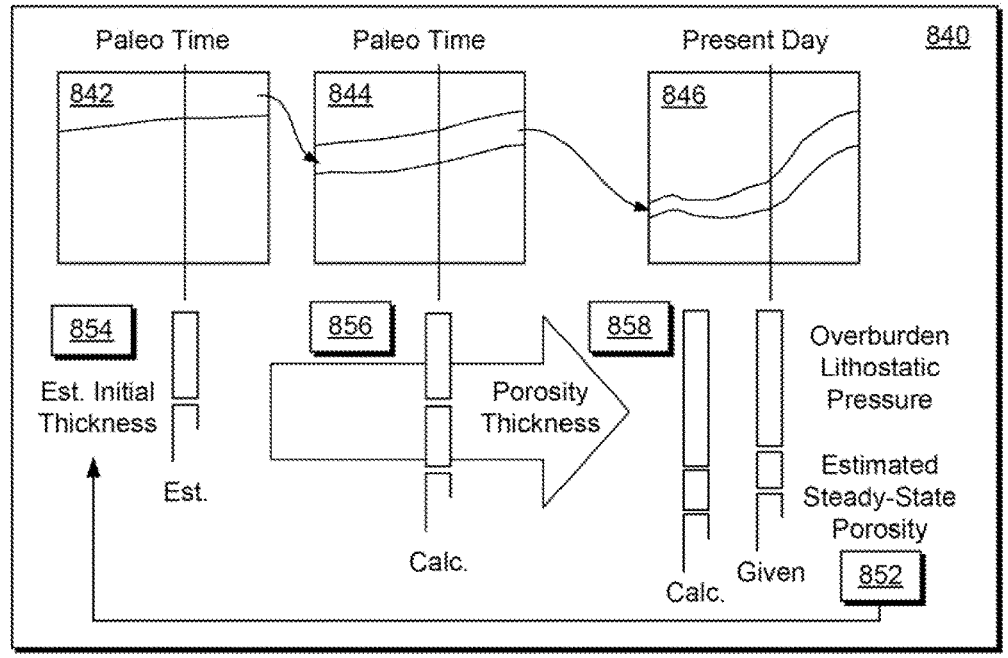

FIG. 8 shows an example of processes 810 and 840 that relate to backstripping and forward simulation of a multilayer sedimentary basin. Such processes may optionally implement, at least in part, a meshless model, for example, using nodes that may correspond to phyxels, surfels, etc. As to backstripping, it may be referred to at times as "event stepping," for example, where paleo-geometries are reconstructed from a present day geometry due to given "geological events". As an example, a first cycle of backstripping and forward simulation may use an estimation of present day porosities (e.g., used as steady state values for hydrostatic pressure conditions) for decompaction where forward simulation yields calculated present day geometry based on pore pressure controlled compaction, for example, where the calculated present day geometry may differ from the present day geometry. In such an example, a second cycle of backstripping and forward simulation can now use calculated present day porosity for decompaction (e.g., rather than the estimated steady state values).

As to the process 810, as shown in a graphic 812 and a plot 814 of thickness (e.g., depth to a basement) with respect to time, at an initial time, T0, a basement exists which defines a base level. As time progresses, the depth of the basement (e.g., the base level) will increase (e.g., for times T1, T2, T3 and T4).

As an example, the process 810 may be part of a backstripping and forward simulation process. For example, multilayer backstripping can include observing a present day fully lithified, stratigraphic sequence that includes four compacted layers 1, 2, 3 and 4 (e.g., or "units"). At a deposition time for layer 1, layer 1 is decompacted to its original thickness and density. At a restoration time T1 for layer 1 and the basement, the basement depth in the absence of layer 1 is isostatically restored to recover its subsidence depth at the restoration time T1 (see, e.g., the basement depth at time T1 in the plot 414). At a deposition time for layer 2, layer 2 is then decompacted to its original thickness and layer 1 is compacted according to its new depth. At a restoration time T2 for layers 1 and 2 and the basement, the decompacted layer 2 and the partially compacted layer 1 are backstripped to recover the basement subsidence depth at the restoration time T2 (see, e.g., the basement depth at time T2 in the plot

814). The process continues for layers 3 and 4 such that the basement depth progresses deeper with respect to time, for example, as shown in the plot 814.

In the example of FIG. 8, the plot 814 of the depth of the basement progresses in a nonlinear manner with respect to time, for example, determined in part by use of the compaction equation 820. In such an example, each of the layers is assigned a deposition thickness and a depositional porosity at the time of deposition and, due to compaction, ultimately present day thicknesses and present day porosities result. In contrast, a straight diagonal line in the plot 814 corresponds to sediment accumulation with respect to time without compaction. Again, as shown in the plot 814, where compaction is taken into account for the process 810, the basement moves nonlinearly with respect to time in response to events that deposit sediment over the basement.

As to the process 840 of FIG. 8, plots 842, 844 and 846 show examples of sediment evolution with respect to time for paleo times (e.g., historical geologic times) and for present day. As an example, the process 840 of FIG. 8 may be described in a simplified manner with respect to blocks 852, 854, 856 and 858 as being a backstripping with decompaction and forward simulation cycle that provides calculated porosities, which, in turn, may be used in a subsequent cycle.

In the example of FIG. 8, the process 840 includes, for present day, an estimation block 852 that may provide an estimated steady-state porosity for a layer in a given sequence of layers of sediment (e.g., for a first cycle). Given the estimated porosities, another estimation block 854 estimates an initial thickness for that layer where that initial thickness may be deemed to correspond to a paleo time, for example, a time at which the layer was deposited. In a forward simulation block 856, porosities and thickness are calculated and, to account for additional layers deposited in paleo time, a results block 858 provides for calculated porosities and thicknesses (e.g., geometry) for present day. In turn, the given and the calculated information may be compared and a decision made to repeat the cycle, however, rather than using the estimated steady-state porosity (e.g., porosities), the results of the results block 858 may be provided to enhance the initial thickness estimates per the estimates block 854 in a subsequent cycle. Additional cycles may be performed, for example, until results given by the results block 858 converge.

Referring again to the equation 820, it may be used to decompact layers, for example, assuming conservation of solid matrix volume. Present day porosities may not be known a priori as they can depend on pore pressure development. Thus, when performing a first backstripping and forward simulation cycle, estimated present day porosities may be used as the steady-state values for hydrostatic pressure conditions. As an example, forward simulation can calculate present day geometry based on pore pressure controlled compaction, which may yield results that differ from the given present day geometry. As mentioned, in a subsequent cycle, the difference between calculated present day geometry and the given present day geometry will likely diminish as calculated present day porosities are provided based on decompaction, in contrast to the first cycle steady-state estimates.

As an example, erosion may also be modeled, for example, where definitions are provided for eroded thicknesses and erosion ages. As an example, eroded thicknesses may be given with virtual horizons or thicknesses at time of deposition, at present day or other geologic events. As an example, multiple erosions of one layer and one erosion on multiple layers may be recognized with virtual horizons. Interpretation of eroded thicknesses may, for example, be performed using a backstripped and decompacted paleogeometry. In such an example, porosity at the erosion age may be considered for decompaction of overconsolidated rocks.

As an example, horizontal movements of layers like salt may be described with addition of thickness maps, for example, during doming. Such changes may be realized by layer stretching and thinning. As an example, one or more salt maps may be provided for various geologic events (e.g., based on kinematic models) that may be taken into consideration during a cycle. Where salt domes, salt pillows, etc., are modeled, high overburden may result in reverse structures. Various techniques may be applied, for example, to handle salt intrusions, for example, into one or more overburden layers.

Figure 9:
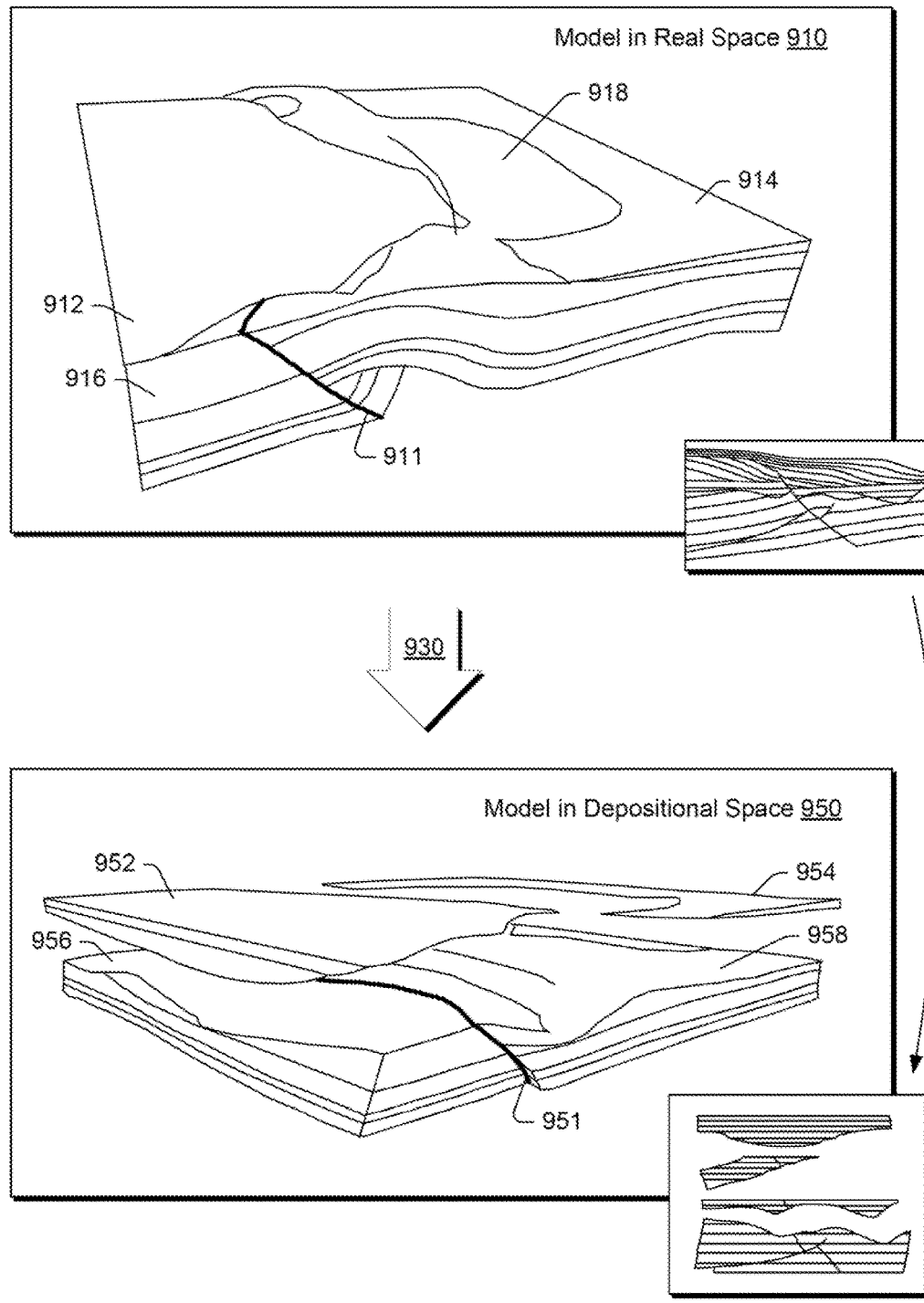
FIG. 9 illustrates an example of a method.

FIG. 9 pertains to transforming a model in a real space 910 to a model in a depositional space 950 via a process 930 that includes, at least in part, a meshless model.

As an example, a method can include building a grid that accounts for one or more faults in a manner where an indexical structure of the grid is preserved (e.g., a structured grid that accounts for one or more faults). Such a method may include use of multiple coordinate systems, which may be referred to at times, for example, as "domains" or "spaces". For example, a method may include use of a "real" space or domain and a "computational" space or domain. As to a real space or domain, it may be referred to at times, for example, as a geological space or domain. As to a computational space or domain, it may be referred to at times, for example, as a depositional space or domain. Again, a space or domain may be defined using a coordinate system, which may be Cartesian or any another form.

For a sedimentary basin, a computational space (e.g., or depositional domain) may be characterized, for example, as a space: (i) where isochrons (conformable horizons) identified within a real space (e.g., a geological domain) tend to be planar and parallel, (ii) where each point of the computational space located inside a stratigraphic sequence may include a corresponding location in a later-day real space (e.g., a present-day space), and (iii) where geometry of a real space tends to be physically relevant (e.g., representative of actual physical features).

As to item (ii), as an example, a scenario may arise where such a characterization may hold generally, with one or more exceptions. For example, individual points located in a volume of interest (VOI) defined in a real space (e.g. present day space) may correspond to at least one point in a computational space; noting that individual points located onto one or several faults may correspond to several points in the computational space. And, conversely, individual points located in a meshed portion of a computational space may correspond to a single point in a real space and individual points located in an unmeshed portion of a computational space (e.g., in a gap between stratigraphic sequences) may correspond to sediments that have been eroded/not deposited in the real space.

As to a stratigraphic sequence, a sedimentary basin may include sedimentary deposits grouped into stratigraphic units, for example, based on any of a variety of factors, to approximate or represent time lines that place stratigraphy in a chronostratigraphic framework. While sequence stratigraphy is mentioned, lithostratigraphy may be applied, for example, based on similarity of lithology of rock units (e.g., rather than time-related factors).

As an example, a meshless model may be built with respect to a computational space, which, for example, may be a three-dimensional computational space defined by three computational space coordinates (u, v, w), which may be stored on nodes representing a real space (e.g., specified in a Cartesian coordinate system with coordinates x, y, z). Such nodes may be referred to as background nodes. Background nodes may include the property of being distributed in a manner (e.g., or otherwise defined) such that they may be conformal to geological discontinuities and optionally conformal to stratigraphy or optionally conformal to both stratigraphy and geological discontinuities (e.g., faults, unconformities, intrusions, model boundaries, etc.). As an example, distribution of computational space coordinates for background nodes may be such that when mapped to a computational space domain coordinate system (e.g., u, v, w), the real features (e.g., other than non-conformable sequence boundaries) are unfaulted and unfolded (e.g., all post-depositional deformations having altered material therein has been removed).

Referring again to FIG. 9 as shown, the model in the real space 910 includes a fault 911 as well as various layers 912, 914, 916 and 918. As shown, the layers 912 and 914 correspond to a common event and the layers 916 and 918 correspond to a common event, for example, where on one side of the fault 911, the layer 918 is exposed, for example, due to erosion (e.g., or non-deposited material). As to the model in the computational space 950, a corresponding fault 951 exists along with corresponding layers exist 952, 954, 956 and 958. For the model in the computational space 950, geological unconformities have not been flattened and eroded or non-deposited material is represented by a gap between layers 952 and 956 and layers 954 and 958 in the computational space.

As an example, situations may exist where points of a VOI in a real space have a counterpart in a computational space, yet one or more points of the computational space may not have a counterpart in the real space. For example, a computation space may include one or more points corresponding to eroded or non-deposited sediments that do not have a counterpart in the real space. As an example, a real space coordinate system (x, y, z) to computational space coordinate system (u, v, w) transform may be represented by an (u, v, w) scalar field, by a vector field, etc. In such an example, a transform may be represented by a scalar field, a vector field, etc., which is discontinuous across a fault and, for example, one or more unconformity surfaces.

As an example, a method can include construction of an un-faulted 3D structured grid in a previously computed computational space. As an example, an areal extent of a model (e.g., including at least in part a meshless model) may be defined in such a way that at least a portion of the areal extent corresponds to that covering a 3D VOI, for example, once it has been converted to a computational space. As an example, in a computational space a 3D model may be composed of planar layers of substantially constant thickness where, for example, flattened horizons are incorporated as boundaries between. In such an example, a number of nodes between two flattened horizons may be defined arbitrarily, for example, adhering to one or more criteria for a meshless model (e.g., as to domains of influence, etc.).

As an example, a method may include sampling points for at least a portion of a model of a geologic environment; generating a meshless model based at least in part on the points where the points correspond to nodes having respective domains of influence; and, based at least in part on the meshless model, computing a tensor field associated with forces experienced by at least a portion of the nodes. In such an example, the tensor field may be or include a gradient of a displacement vector field for force-related displacement of at least a portion of the nodes.

As an example, a method may include setting one or more visibility criteria that truncates at least one domains of influence with respect to a feature in a model of a geological environment. As an example, a visibility criterion may be a diffraction technique criterion, a transparency technique criterion or other type of criterion. As an example, a feature may be a discontinuity. As an example, a feature may be a member selected from a group that has or includes a horizon, a fault, a fracture and a geobody.

As an example, a method may include computing values for at least one implicit function within a space of a meshless model. In such an example, a value of the values of the implicit function may be an isovalue that defines an isosurface in the space of the meshless model. In such an example, a method may include setting one or more visibility criteria based at least in part on the isosurface.

As an example, a meshless model may include phyxels, surfels or phyxels and surfels. For example, a node may be or correspond to a phyxel or a surfel.

As an example, a method may include performing a restoration of a geologic environment based at least in part on a tensor field computed using, at least in part, a meshless model. As an example, a model of a geologic environment may be or include a historic model that represents the geologic environment at a time at prior to the Holocene epoch.

As an example, a method may include constructing a depositional space for at least a portion of a geologic environment based at least in part on a tensor field computed using, at least in part, a meshless model.

As an example, a system may include a processor; memory operatively coupled to the processor; and one or more modules that include processor-executable instructions stored in the memory to instruct the system to sample points for at least a portion of a model of a geologic environment; generate a meshless model based at least in part on the points where the points correspond to nodes having respective domains of influence; and, based at least in part on the meshless model, compute a tensor field associated with forces experienced by at least a portion of the nodes. As an example, such a system may include instructions to instruct the system to set one or more visibility criteria that truncates at least one of the domains of influence with respect to a feature in the model of the geological environment.

As an example, a system may include instructions to instruct the system to compute values for at least one implicit function within a space of a meshless model. As an example, a system may include instructions to instruct the system to perform a restoration of a geologic environment based at least in part on a tensor field (e.g., computed using, at least in part, a meshless model). As an example, a system may include instructions to instruct the system to construct a depositional space for at least a portion of a geologic environment based at least in part on a tensor field (e.g., computed using, at least in part, a meshless model).

As an example, one or more computer-readable storage media may include computer-executable instructions to instruct a computing system to: sample points for at least a portion of a model of a geologic environment; generate a meshless model based at least in part on the points where the points correspond to nodes having respective domains of influence; and, based at least in part on the meshless model, compute a tensor field associated with forces experienced by at least a portion of the nodes. As an example, one or more computer-readable storage media may include computer-executable instructions to instruct a computing system to perform petroleum systems modeling based at least in part on a tensor field (e.g., computed using, at least in part, a meshless model).

Figure 10:
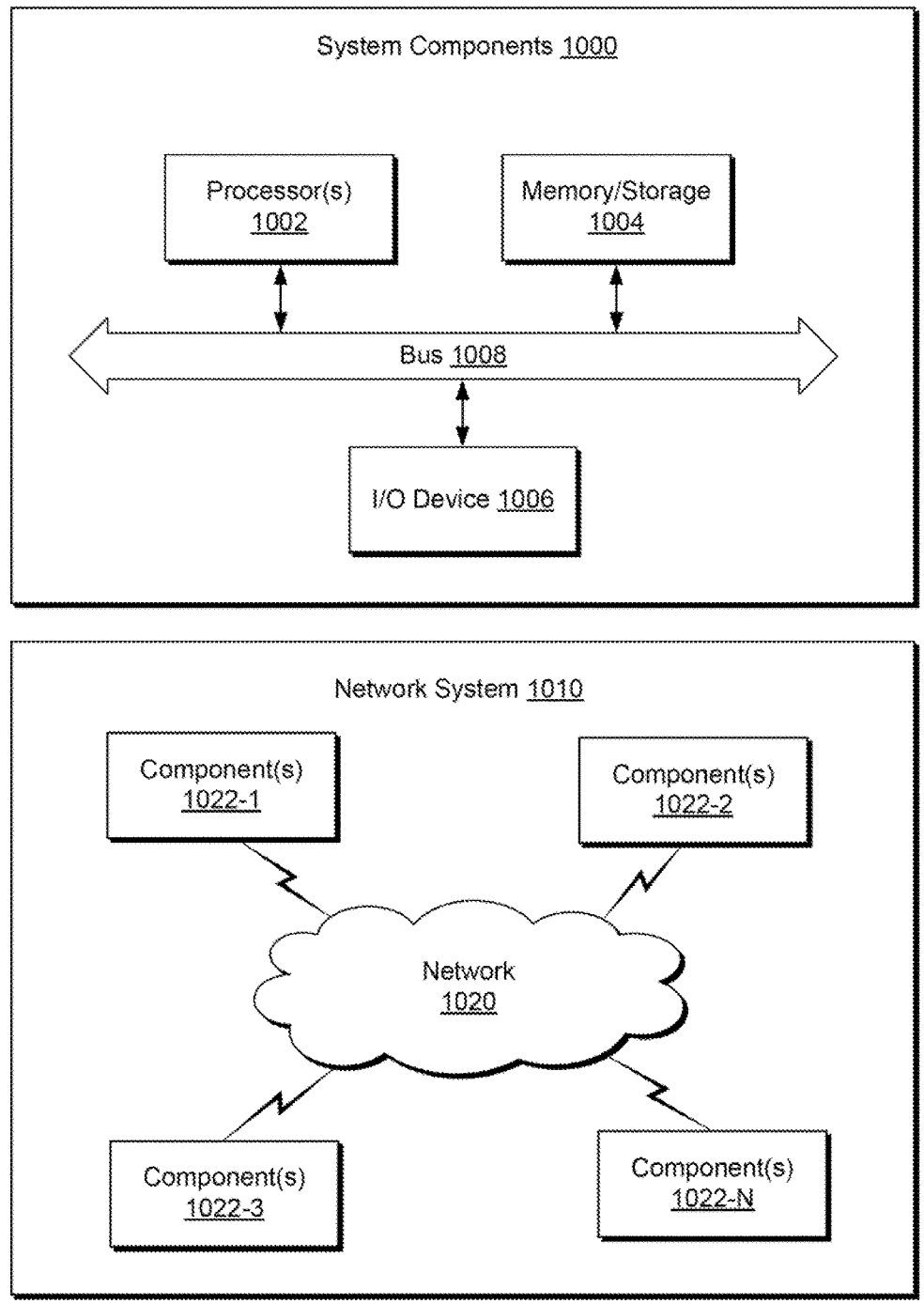
FIG. 10 illustrates example components of a system and a networked system.

FIG. 10 shows components of an example of a computing system 1000 and an example of a networked system 1010. The system 1000 includes one or more processors 1002, memory and/or storage components 1004, one or more input and/or output devices 1006 and a bus 1008. In an example embodiment, instructions may be stored in one or more computer-readable media (e.g., memory/storage components 1004). Such instructions may be read by one or more processors (e.g., the processor(s) 1002) via a communication bus (e.g., the bus 1008), which may be wired or wireless. The one or more processors may execute such instructions to implement (wholly or in part) one or more attributes (e.g., as part of a method). A user may view output from and interact with a process via an I/O device (e.g., the device 1006). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1010. The network system 1010 includes components 1022-1, 1022-2, 1022-3, . . . 1022-N. For example, the components 1022-1 may include the processor(s) 1002 while the component(s) 1022-3 may include memory accessible by the processor(s) 1002. Further, the component(s) 1002-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
sampling points for at least a portion of a model of a geologic environment;
generating a meshless model based at least in part on the points wherein the points correspond to nodes having respective domains of influence wherein a discontinuity of a feature in the geologic environment is subject to a visibility criterion;
based at least in part on the meshless model, computing a tensor field associated with forces experienced by at least a portion of the nodes; and
performing a restoration of the geologic environment to an earlier time based at least in part on the tensor field.

2. The method of claim 1 wherein the tensor field comprises a gradient of a displacement vector field for force-related displacement of at least a portion of the nodes.

3. The method of claim 1 further comprising setting one or more visibility criteria that truncates at least one of the domains of influence with respect to a feature in the model of the geological environment.

4. The method of claim 3 wherein the feature comprises a discontinuity.

5. The method of claim 3 wherein the feature comprises a member selected from a group consisting of a horizon, a fault, a fracture and a geobody.

6. The method of claim 1 further comprising computing values for at least one implicit function within a space of the meshless model.

7. The method of claim 6 wherein a value of the values of the implicit function is an isovalue that defines an isosurface in the space of the meshless model.

8. The method of claim 7 comprising setting one or more visibility criteria based at least in part on the isosurface.

9. The method of claim 1 wherein the nodes comprise phyxels.

10. The method of claim 1 wherein the nodes comprise surfels.

11. The method of claim 1 wherein the model of the geologic environment comprises a historic model that represents the geologic environment at a time at prior to the Holocene epoch.

12. The method of claim 1 further comprising constructing a depositional space for at least a portion of the geologic environment based at least in part on the tensor field.

13. The method of claim 1 comprising acquiring seismic data in the geologic environment; based at least in part on the seismic data, identifying a horizon; and generating the model of a geologic environment wherein the model comprises a representation of the horizon.

14. The method of claim 1 comprising identifying a location of hydrocarbons in the geologic environment based at least in part on the performing a restoration.

15. A system comprising:
a processor;
memory operatively coupled to the processor; and
processor-executable instructions stored in the memory to instruct the system to:
sample points for at least a portion of a model of a geologic environment;
generate a meshless model based at least in part on the points wherein the points correspond to nodes having respective domains of influence wherein a discontinuity of a feature in the geologic environment is subject to a visibility criterion;
based at least in part on the meshless model, compute a tensor field associated with forces experienced by at least a portion of the nodes; and
perform a restoration of the geologic environment to an early time based at least in part on the tensor field.

16. The system of claim 15 further comprising instructions to instruct the system to set one or more visibility criteria that truncates at least one of the domains of influence with respect to a feature in the model of the geological environment.

17. The system of claim 15 further comprising instructions to instruct the system to compute values for at least one implicit function within a space of the meshless model.

18. The system of claim 15 further comprising instructions to instruct the system to construct a depositional space for at least a portion of the geologic environment based at least in part on the tensor field.

19. One or more non-transitory computer-readable storage media comprising computer-executable instructions to instruct a computing system to:
sample points for at least a portion of a model of a geologic environment;
generate a meshless model based at least in part on the points wherein the points correspond to nodes having respective domains of influence wherein a discontinuity of a feature in the geologic environment is subject to a visibility criterion;
based at least in part on the meshless model, compute a tensor field associated with forces experienced by at least a portion of the nodes; and
perform a restoration of the geologic environment to an early time based at least in part on the tensor field.

20. The one or more non-transitory computer-readable storage media of claim 19 further comprising computer-executable instructions to instruct a computing system to perform petroleum systems modeling based at least in part on the tensor field.

* * * * *